United States Patent [19]

Prete

[11] 4,243,626

[45] Jan. 6, 1981

[54] METHOD OF MAKING ORNAMENTAL JEWELRY STONES

[76] Inventor: John E. Prete, 34 Tanglewood Dr., Cumberland, R.I. 02864

[21] Appl. No.: 41,191

[22] Filed: May 21, 1979

[51] Int. Cl.³ .................. B29C 13/00; B29C 21/00
[52] U.S. Cl. .................. 264/153; 63/DIG. 3; 264/163; 264/251; 428/13; 428/68; 428/76; 430/13
[58] Field of Search .............. 427/209; 264/271, 163, 264/246, 247, 254, 251, 153; 428/13, 67, 68, 76; 40/358, 10 D; 63/23, 32, DIG. 3; 96/50 PL; 430/12, 13, 951, 952

[56] References Cited

U.S. PATENT DOCUMENTS

| | | | |
|---|---|---|---|
| 3,613,265 | 10/1971 | Stern et al. | 428/13 X |
| 3,725,112 | 4/1973 | Hansen | 428/13 |
| 4,092,173 | 5/1978 | Novak et al. | 96/50 PL |

FOREIGN PATENT DOCUMENTS 2324470  5/1977  France ........................... 428/67

Primary Examiner—Evan K. Lawrence
Attorney, Agent, or Firm—Salter & Michaelson

[57] ABSTRACT

A process of forming a decorative jewelry stone wherein a photographic film image, created by photographing positive artwork and being essentially transparent except for the image thereon, is utilized as the mold for receiving an uncured plastic resin in substantially liquid form. The resin is permitted to cure, the resultant partially formed article with the film portion attached thereto reversed in position such that a second amount of similar resin can be applied thereto to essentially embed the film portion therein. Since the film portion is essentially transparent except for the image thereon, the remaining portions of the film visually merges with the resin segments on either side thereof such that only the image is readily observable.

11 Claims, 11 Drawing Figures

METHOD OF MAKING ORNAMENTAL JEWELRY STONES

BACKGROUND OF THE INVENTION

This invention relates to decorative jewelry articles and particularly to a novel process of forming such.

It is known to embed actual objects including photographs within clear or partially clear plastic material such as commerically available epoxy or acrylic resins. In order to accomplish this, a first segment of the article is usually cast within a mold and, after hardening to a sufficient extent, the object placed directly thereupon. Thereafter, further identical or at least compatible resin material is added to the mold and on top of the object so as to completely embed such within the resultant article. The article then can be reshaped to its final form and, if necessary, polished or otherwise mounted or supported for its appropriate use. Such methods, although generally practiced, include serious drawbacks including the expense and often the unavailability of substantially identical actual objects to be embedded in those cases where substantial conformity is desired, such as in mass production. Another drawback is the obviousness and resultant cheapened effect of utilizing a photograph when the intent is to create the impression of having used original artwork or objects for embedding.

SUMMARY OF THE INVENTION

It is accordingly an object of the present invention to provide a process for forming decorative jewelry articles such as stones wherein the impression of having embedded original objects or artwork in the stone is created, yet, such is accomplished in a substantially less expensive manner.

A further object of the present invention is the formation of articles as indicated immediately above, which process lends itself to assembly line production, that is, the repetition of a series of steps which can be easily performed by relatively unskilled labor.

A still further object of the present invention is the provision of a process for forming decorative jewelry articles of the aforementioned type in which the necessity of utilizing separate mold elements is eliminated.

These and other objects of the present invention are accomplished by a method wherein a portion of a photographic film transparency formed from photographing an artwork positive and having at least one image thereon is utilized as a mold element and receives on the uppermost surface thereof a preselected amount of an uncured plastic resin which is either transparent or translucent and in substantially liquid form, yet viscous enough such that it hardens to form a desired article configuration while supported on such film portion. Thereafter, such segment with the attached film portion is reversed and a second preselected amount of a similar or at least compatible uncured plastic resin is deposited in a similar manner on the other film portion surface such that the completed article is formed. Inasmuch as the non-image parts of the film portions are substantially transparent, they visually merge with the resin segments such that the resultant appearance is that an original object or artwork has been embedded within the stone.

Other objects, features, and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DESCRIPTION OF THE PREFERRED EMBODIMENTS

Figure 1:
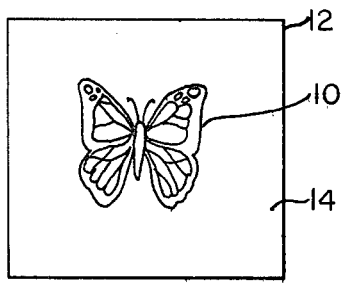
FIG. 1 is a plan view of a two-dimensional piece of artwork forming a master image.

Turning now to the drawing, and in particular FIG. 1 thereof, master artwork 10 in the form of a two-dimensional drawing upon suitable artist's board 12 or the like is shown in the form of a butterfly. The artwork 10 is preferably colored and may take three-dimensional form or include an actual article, i.e. a butterfly, in lieu of a representation thereof as shown in FIG. 1. The upper surface or face 14 of the board 12 is unadorned except for the presence of the artwork 10 and is preferably of an even color such as white or off-white.

Figure 2:
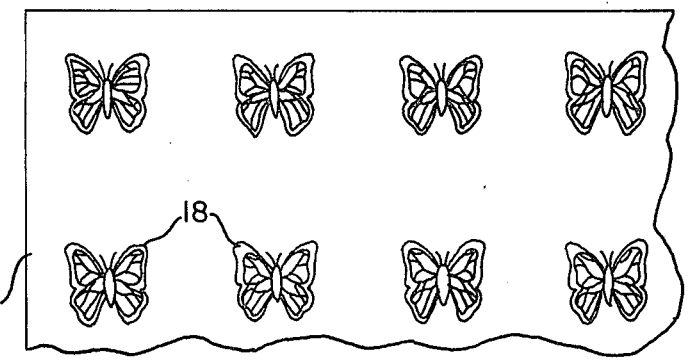
FIG. 2 is a partial plan view of a film transparency having a plurality of substantially identical images.

From such master artwork, as shown in FIG. 1, a multiple image film transparency 16 shown in FIG. 2 is formed by photographing the artwork by a camera which reduces the artwork to the desired image size and thereafter repeating such photographic step the desired number of times such that when the film utilized for such purpose is developed, a film strip results which has a plurality of the reduced images thereon. The resultant film strip negative is then cut into sections and mounted on a glass backing to form a production negative which is thereafter developed so as to provide a positive print having the desired number of individual artwork images thereon. Thereafter, the positive photograph, i.e. the print, is photographed with a camera that bleeds out the background such that the resulting film transparency 16 reproduces all of the individual artwork images simultaneously but on a transparent background. Such individual images are referred to by reference numeral 18.

Other known manners in forming a transparency 16 having a multiple number of essentially identical images 18 thereon may be utilized, such as photographing the original artwork so as to produce a single negative and then forming a plurality of positive prints from such negative and thereafter assembling such prints in a secondary master artwork assemblage which is then photographed to produce the multiple image negative or transparency 16 as depicted in FIG. 2.

Figure 3:
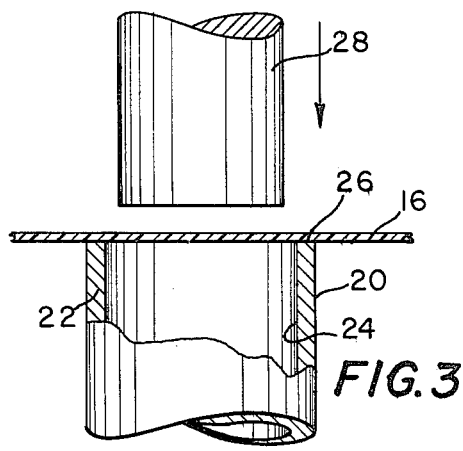
FIG. 3 is a partial sectional view showing the manner in which a film portion having a single image thereon may be removed as by die-cutting from the film transparency shown in FIG. 2.
Figure 4:
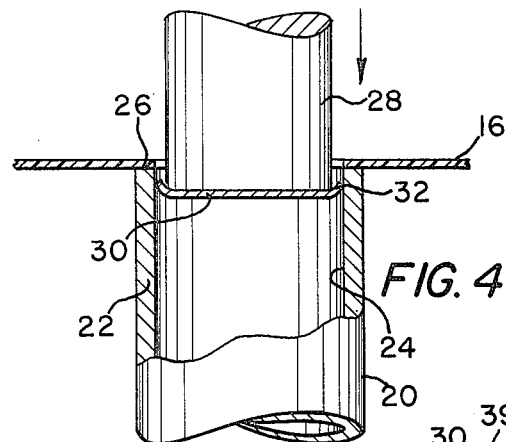
FIG. 4 is a view similar to FIG. 3 but showing a film portion already removed from the transparency.
Figure 5:
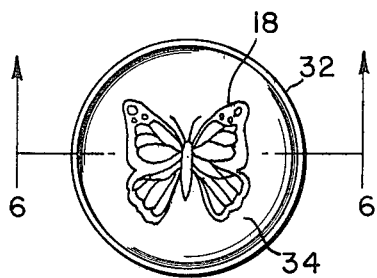
FIG. 5 is a plan view of the film portion removed from the multiple image transparency shown in FIG. 2.

Referring now to FIGS. 3 and 4 in particular, a die set 20 is shown including a die 22 having a central opening or cavity 24 formed therein and defining a peripheral edge 26 such that the transparency 16 is adapted to rest thereon. The die set includes a punch 28 having a slightly smaller diameter than that of the cavity 24. The punch 28 is adapted to move into the cavity 24 as shown by the progression between FIGS. 3 and 4 of the drawing so as to sever a film portion 30 of the transparency 16. The portion 30 is substantially of circular planar configuration and includes one of the images 18 generally centered therein, that is, the multiple image transparency 16 is oriented with respect to the die set such that the film portion 30 severed therefrom by the above-described die-cutting procedure includes that portion of the artwork image 18 desired to be displayed in the final article. Obviously in the case of the butterfly depicted in the drawing, the entire butterfly would normally be disposed within the film portion 30 and in a centered position, however, with some artwork images only a part thereof may be desired to be displayed in the final article and accordingly in such cases the orientation of the die set 20 is such that those desired parts are removed from the multiple image transparency 16. The above die-cut operation is repeated until the desired number of film portions 30 have been produced, that is, one film portion 30 for each final article A desired.

It should be noted that as the punch 28 moves through the transparency 16 so as to sever the film portion 30 therefrom, it cooperates with the somewhat larger opening 24 of the die 22 so as to deform the edge of the film portion 30. The deformation caused by such coaction of the punch and die portions of the die set 20 results in a permanent deformation or reshaping of the peripheral area of the film portion 30 and specifically results in an upturned peripheral lip 32. In that regard the diameter of the punch 28 is purposely undersized an amount greater than is necessary to effect a straight cutting of the disc-like film portion 30 from the transparency 16 such that a permanent bending or deformation of the peripheral edge of the film portion 30 occurs to form the upwardly directed peripheral lip 32. It may thus be apparent that the central portion of the upper surface area 34 of the film portion 30 is of a generally planar configuration and such in cooperation with the upturned peripheral lip 32 thereof defines a shallow dish-like configuration. The film portion 30 also includes a bottom surface 35.

Figure 7:
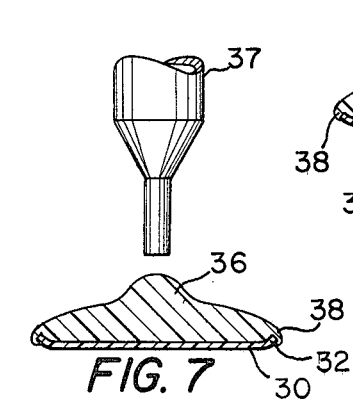
FIG. 7 is an elevational view partially in section showing another step in the present method in which an amount of uncured resin has been deposited on the top surface of the film portion.
Figures 8, 9, 10:
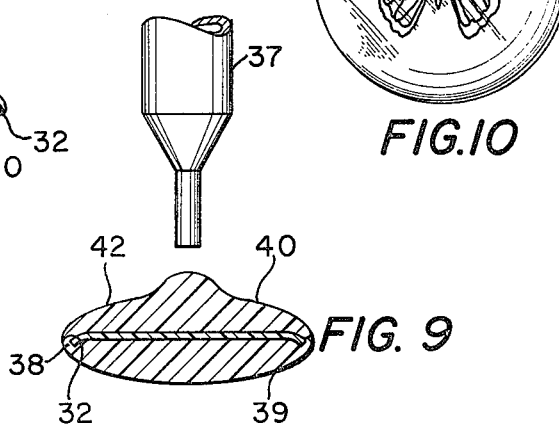
FIG. 8 shows the partially completed article formed in the process step depicted in FIG. 7.
FIG. 9 shows an additional step in the process whereby resin material has been deposited upon the bottom surface of the film portion.
FIG. 10 is a plan view showing the completed article of the present process.

Reference is now made to FIGS. 7 through 9 of the drawing in particular, wherein the manner in which the film portion 30 is utilized so as to form the completed decorative article A of the present invention is best described. In FIG. 7 the film portion 30 is supported in a generally flat position, with surface 34 upwardly disposed, by any known means and thereafter a predetermined amount of an uncured substantially fluid plastic resin such as commercially available epoxy resin is deposited on the upper surface 34 of the film portion 30. The resin 36 may be applied drop by drop from the nozzle 37 of automatic or manually operated dispensing equipment of known design (not shown). In this regard the surface tension of the plastic material is preferably sufficient so that the resin 36 assumes a somewhat rounded or bead-like configuration and is in part retained on the upper surface 34 by such surface tension effect. In addition, the resin, much in the manner in which rising bread will overlap the peripheral edge of a baking pan, slumps over the peripheral lip 32 so as to form a slight bead 38 which radially extends outwardly of the outer edge of the peripheral lip 32.

The configuration assumed by the first resin material is depicted in FIG. 8, that is, the resin forms a first segment 39 having a smooth, somewhat centrally raised domed shape. It should be understood that the first segment 39 is at least temporarily attached to the film portion 30. Thereafter, the partially completed article as shown in FIG. 8 is reversed such that the first segment 39 supports the film portion 30 such that its bottom surface 35 is exposed in the uppermost position. Thereafter a predetermined amount of a second uncured plastic resin 40 is deposited on the bottom surface 35 of the film portion in a manner similar to that previously described in relationship to FIG. 7. In this added procedure, the second resin 40 to some extend is retained on the now-uppermost disposed bottom surface 35 by reason of the outwardly extending bead 38. Upon curing, the resin 40 forms a second segment 42 which essentially merges with the film portion 30 and the first segment 39. By reason of the essential transparency of those parts of the film portion 30 not having an image or portion of an image 18 provided thereon, the resin segments 39 and 42 essentially combine such that in the completed jewelry article A, only the image 18 is discernable therein, that is, the transparency of the segments 39 and 42 enables one to see directly through or at least partially through the article A and thus the non-image-bearing film portions 30 are not readily observable. In this regard, generally both of the segments 39 and 42 may be transparent, translucent, or a combination thereof, that is, one of the segments may be translucent and the other transparent so as to obtain various desired visual effects.

Figures 6, 11:
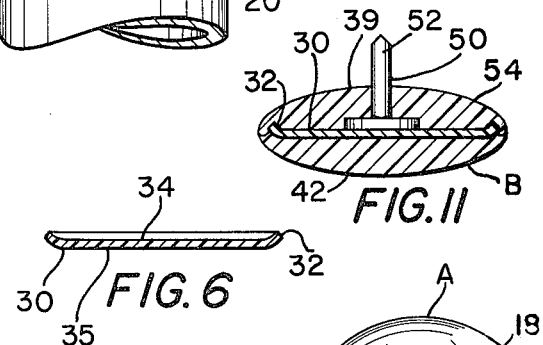
FIG. 6 is a sectional view taken along the line 6—6 of FIG. 5 and shows in particular the manner in which the film portion is reshaped by the cutting step shown in FIGS. 3 and 4.
FIG. 11 is a sectional view illustrating a different article which may be formed by the process of the present invention.

Turning now to FIG. 11 of the drawing, a modified form B of a jewelry article is shown wherein support means in the form of an attachment stud 50 is embedded into the article B in such a manner that it can be used to attach such article to ones clothing and the like as in combination with a clutch mechanism of known construction. The stud 50 includes a pin 52 in turn connected to an enlarged generally planar head 54. In this regard, the weight of the attachment stud may in some cases be useful to prevent the film portion 30 from becoming wrinkled or curled as may happen in certain cases as when the resin curing or hardening process develops an excessive amount of heat. It is desirable to prevent such wrinkling or curling since such may distort the image 18 provided therein, The weight of the member 50 has been found useful to prevent or minimize such possible undesirable distortion. It has also been found in some cases desirable to place partially completed articles such as shown in either FIGS. 7 or 9 under refrigeration so as to dissipate or reduce the amount of heat generated by the curing of the resinous material.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims. For instance, in some cases the normally partially finished article as shown in FIG. 8 may form the completed article, i.e. when the stone is used as the decorative element in a ring or pendant or when the article requires a substantially flat back as for mounting.

What is claimed is:

1. The process of forming an ornamental article comprising forming a photographic film transparency having substantially transparent areas and at least one image thereon, reshaping said film so as to provide at least one substantially planar film image portion having an upwardly directed peripheral lip, depositing a sufficient amount of a first at least translucent plastic hardenable resin in a substantially fluid state on the upper surface of said thus formed film portion such that said resin covers said upper surface and said lip thereof retains said resin on said upper surface but permits a minor portion thereof to slump over said lip so as to form a peripheral bead having portions radially extending beyond said film portion lip, permitting said first resin to harden to thus form one segment of said article, and thereafter reversing said partially formed article such that the bottom surface of said film portion is uppermost and depositing a sufficient amount of a second at least translucent plastic hardenable resin in a substantially fluid state on said film portion bottom surface such that said second resin substantially covers said bottom surface and contacts at least a portion of said bead so as to essentially encapsulate said film portion and thereafter permitting said second resin to harden to thus form another segment of said article and so as to complete the formation of said article, said segments and said substantially transparent areas of said film portion visually merging so that only said image of said film portion is substantially observable in such completed article.

2. The process of claim 1, wherein said resins are each deposited in a bead-like configuration and are of an initial viscosity so as to harden in segments exhibiting smoothly rounded outer surfaces.

3. The process of claim 1 or claim 2, wherein said film transparency is reshaped while being simultaneously die-cut to form said film image portion.

4. The process of claim 3, wherein the steps of reshaping and simultaneous die-cutting include supporting said film transparency upon a shaping die having a central opening with the image thereof substantially aligned with said opening, and directing a cutting element against said film and into said opening so as to remove said film image portion from the remaining portions of said film transparency.

5. The process of claim 3, including the step of forming a plurality of separate, essentially identical images on said film transparency and wherein said film transparency is subsequently reshaped and die cut a plurality of times so as to form a plurality of said film image portions each having at least a portion of one of said plurality of separate images thereon.

6. The process of claim 5, wherein said film transparency is formed by photographing a primary artwork positive which is to form said image so as to create a photographic negative of said artwork, forming a plurality of positive prints from said negative, assembling said prints to form a multiple secondary artwork positive under photographic conditions so as to form a film transparency having multiple images on an essentially transparent background.

7. The process of claim 1, including providing support means for said article, said support means having a planar head portion, and disposing said head portion against the uppermost surface of said film portion during the application and hardening of said first resin thereon, the weight of said support means assisting in preventing undesirable distortion of said image thereon.

8. The process of claim 1, wherein one of said resins is translucent and the other is transparent.

9. The process of claim 1, wherein said first and second resins are substantially of the same composition and are both substantially transparent.

10. The process of claim 9, wherein said resins are commercially available thermosetting epoxy resins.

11. The process of forming an ornamental article comprising, forming a photographic film transparency having substantially transparent areas and at least one image thereon, reshaping said film so as to provide a substantially planar film image portion having an upwardly directed peripheral lip, depositing a sufficient amount of an at least translucent plastic resin in a substantially fluid state on the upper surface of said thus formed film portion such that said resin covers said upper surface and is retained thereon while in said fluid state by said peripheral lip, permitting said resin to harden to thus form one segment of said article, said segment and said substantially transparent areas of said film portion visually merging so that only said image of said film portion is substantially observable in the completed article.

* * * * *